(12) United States Patent
Cinpinski et al.

(10) Patent No.: US 7,827,968 B2
(45) Date of Patent: Nov. 9, 2010

(54) DIRECT INJECTED FUEL PUMP DIAGNOSTIC SYSTEMS AND METHODS

(75) Inventors: Kenneth J. Cinpinski, Ray, MI (US); Donovan L. Dibble, Utica, MI (US)

(73) Assignee: GM Global Technology Operations, Inc.

( * ) Notice: Subject to any disclaimer, the term of this patent is extended or adjusted under 35 U.S.C. 154(b) by 34 days.

(21) Appl. No.: 12/421,865

(22) Filed: Apr. 10, 2009

(65) Prior Publication Data

US 2010/0258093 A1 Oct. 14, 2010

(51) Int. Cl.
*F02M 37/04* (2006.01)
*F01L 1/34* (2006.01)

(52) U.S. Cl. .................................. 123/508; 123/90.15
(58) Field of Classification Search .................. 123/508, 123/509, 90.15–90.17
See application file for complete search history.

(56) References Cited

U.S. PATENT DOCUMENTS

| | | | | |
|---|---|---|---|---|
| 5,586,526 A | * | 12/1996 | Lindquist | 123/90.12 |
| 5,899,181 A | * | 5/1999 | Kurata et al. | 123/90.17 |
| 5,983,863 A | * | 11/1999 | Cavanagh et al. | 123/447 |
| 7,246,583 B2 | * | 7/2007 | Cinpinski et al. | 123/90.27 |
| 7,698,935 B2 | * | 4/2010 | Dibble et al. | 73/114.79 |
| 7,743,749 B1 | * | 6/2010 | Suchecki et al. | 123/495 |
| 2005/0193995 A1 | * | 9/2005 | Nomura | 123/568.14 |
| 2010/0154526 A1 | * | 6/2010 | Cinpinski et al. | 73/114.79 |

* cited by examiner

*Primary Examiner*—Thomas N Moulis

(57) ABSTRACT

An engine control system comprises a camshaft, a cam phaser module, a pressure sensor, and an engine control module. The camshaft is operably coupled to a crankshaft of an engine. Rotation of the camshaft operates a fuel pump in driving communication with a cam of the camshaft. The cam phaser module provides hydraulic pressure to change a rotational position of the cam about the camshaft. The pressure sensor determines a cam phaser pressure signal based on a pressure of fluid in the cam phaser module. The engine control module diagnoses a condition of the fuel pump based on the cam phaser pressure signal.

20 Claims, 4 Drawing Sheets

DIRECT INJECTED FUEL PUMP DIAGNOSTIC SYSTEMS AND METHODS

FIELD

The present disclosure relates to fuel pumps of engine systems and more particularly to diagnostic systems and methods for fuel pumps of engine systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to produce a drive torque. The engine may include a spark ignition direct injection (SIDI) engine. The SIDI engine includes access points through which fuel is directly injected into the SIDI engine. The SIDI engine requires high pressure fuel for direct injection. A fuel pump provides pressurized fuel to the SIDI engine.

An ignition system provides a spark to ignite the air/fuel mixture. Combustion of the air/fuel mixture drives pistons, thereby driving a crankshaft of the SIDI engine and producing the drive torque. A camshaft may be rotationally engaged with the crankshaft by any system that transfers rotational energy from the crankshaft to the camshaft. Alternatively, the camshaft may be directly driven by an engine camshaft or by placing cams on the engine camshaft that actuate the camshaft. The camshaft includes at least one cam attached on a radially exterior surface of the camshaft.

A cam phaser system controls the rotational position of the cam about the camshaft. The cam phaser system is hydraulically-controlled, and the pressure of a hydraulic system of the cam phaser system is monitored. The cam engages with a cam follower of the fuel pump to operate the fuel pump.

SUMMARY

An engine control system comprises a camshaft, a cam phaser module, a pressure sensor, and an engine control module. The camshaft is operably coupled to a crankshaft of an engine. Rotation of the camshaft operates a fuel pump in driving communication with a cam of the camshaft. The cam phaser module provides hydraulic pressure to change a rotational position of the cam about the camshaft. The pressure sensor determines a cam phaser pressure signal based on a pressure of fluid in the cam phaser module. The engine control module diagnoses a condition of the fuel pump based on the cam phaser pressure signal.

A method of operating an engine control system comprises operating a fuel pump in driving communication with a cam of a camshaft; providing hydraulic pressure to change a rotational position of the cam about the camshaft; determining a cam phaser pressure signal based on a pressure of fluid in a cam phaser module; and diagnosing a condition of the fuel pump based on the cam phaser pressure signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
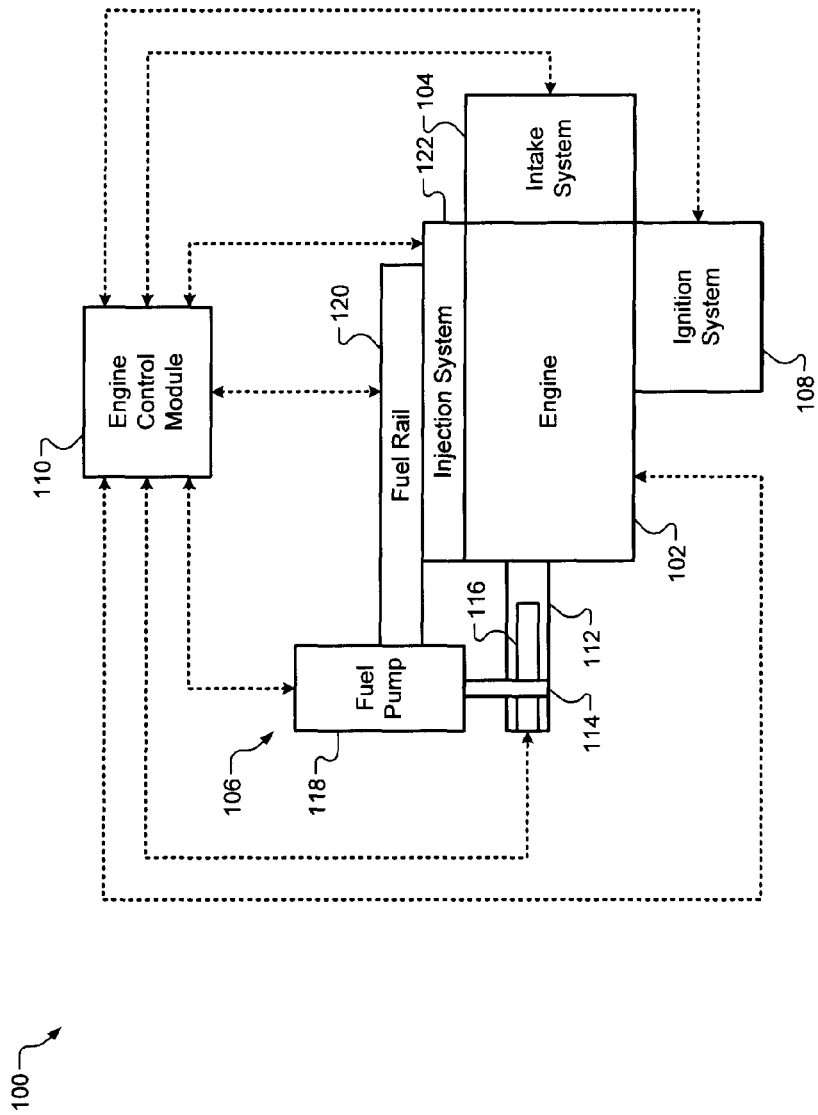
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To diagnose a fuel pump of an engine system, the engine control system of the present disclosure includes a pressure sensor that determines a cam phaser pressure signal based on a pressure of fluid in a cam phaser system. An engine control module diagnoses a condition of the fuel pump based on the cam phaser pressure signal. Further, the engine control system includes a fuel rail pressure sensor that determines a fuel rail pressure signal based on a pressure of fuel provided from the fuel pump to a fuel rail. The engine control module may diagnose the condition of the fuel pump further based on the fuel rail pressure signal.

Referring now to FIG. 1, a functional block diagram of an exemplary engine system 100 is shown. The engine system 100 includes an engine 102, an intake system 104, a fuel system 106, an ignition system 108, and an engine control module 110. The fuel system 106 includes a camshaft 112, a cam 114, a cam phaser system 116, a fuel pump 118, a fuel rail 120, and an injection system 122.

The engine 102 combusts an air/fuel mixture to produce a drive torque. For exemplary purposes only, the engine 102 may include a spark ignition direct injection (SIDI) engine. The SIDI engine requires high pressure fuel for direct injection. Although the following description relates to the SIDI engine, it should be recognized that this description may apply to any engine that utilizes a fuel pump.

Air is drawn into the engine 102 through the intake system 104 and distributed into cylinders (not shown) of the engine 102. The engine 102 includes access points through which fuel is injected by the injection system 122 into the cylinders. The access points allow the engine 102 to operate with a lean air/fuel mixture (i.e., mixture with less fuel than required for a stoichiometric mixture) in comparison to conventional engines without direct injection. The fuel pump 118 provides pressurized fuel to the injection system 122 through the fuel rail 120. The air mixes with the injected fuel and creates the air/fuel mixture in the cylinders.

Pistons (not shown) within the cylinders compress the air/fuel mixture. The ignition system 108 provides a spark to ignite the air/fuel mixture. Combustion of the air/fuel mixture drives the pistons, thereby driving a crankshaft (not shown) of the engine 102 and producing the drive torque.

The camshaft 112 may be rotationally engaged with the crankshaft by any system that transfers rotational energy from the crankshaft to the camshaft 112. Alternatively, the camshaft 112 may be directly driven by an engine camshaft (not shown) or by placing cams on the engine camshaft that actuate the camshaft 112. The camshaft 112 includes at least one cam 114 attached on a radially exterior surface of the camshaft 112.

The cam phaser system 116 controls the rotational position of the cam 114 about the camshaft 112. The cam phaser system 116 is hydraulically-controlled, and the pressure of a hydraulic system of the cam phaser system 116 is monitored. The cam 114 engages with a cam follower (not shown) of the fuel pump 118 to operate the fuel pump 118. For example only, the fuel pump 118 may include a piston pump.

The engine control module 110 controls and communicate with components of the engine system 100. The components include the engine 102, the intake system 104, the ignition system 108, the cam phaser system 116, the fuel pump 118, the fuel rail 120, and the injection system 122. The engine control module 110 receives measurements and status indicators and provides commands that control the operation of the components of the engine system 100.

Figure 2:
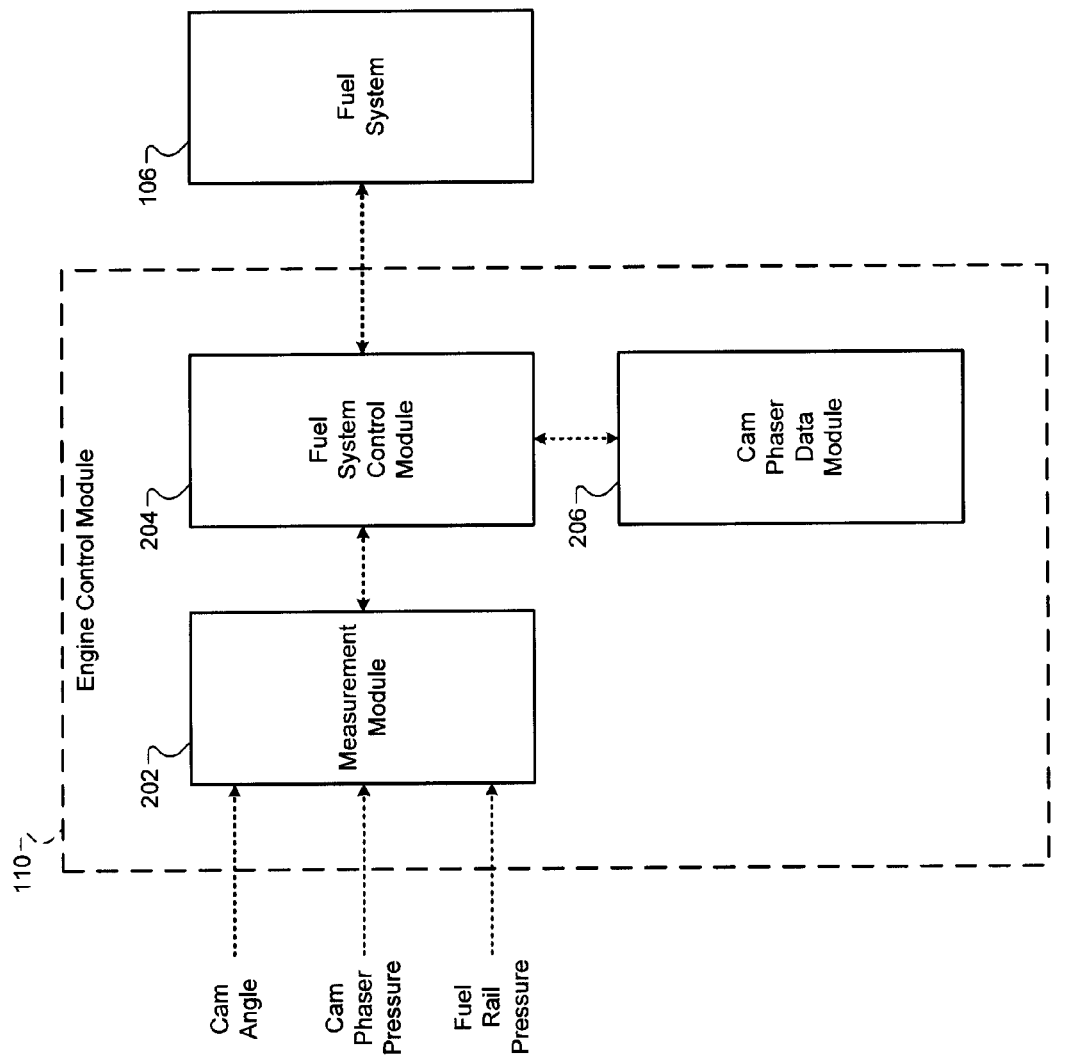
FIG. 2 is a functional block diagram of an exemplary engine control module according to the principles of the present disclosure.

Referring now to FIG. 2, a functional block diagram of the engine control module 110 is shown. The engine control module 110 includes a measurement module 202, a fuel system control module 204, and a cam phaser data module 206. The measurement module 202 is in communication with sensors throughout the engine system 100. The sensors include a sensor of the camshaft 112 providing a rotational position of the camshaft 112 (i.e., a cam angle) and a sensor in the cam phaser system 116 indicating a pressure of hydraulic fluid within the cam phaser system 116 (i.e., a cam phaser pressure). The sensors further include a sensor of the fuel rail 120 indicating a pressure of fuel within the fuel rail 120 (i.e., a fuel rail pressure).

The measurement module 202 may continuously monitor the sensors or may monitor the sensors at regular intervals. For purposes of diagnosing the fuel pump 118, the measurement module 202 may measure the cam phaser and the fuel rail pressures over each 360° rotation of the camshaft 112. The measurement module 202 is in communication with the fuel system control module 204 and outputs the measured values to the fuel system control module 204.

The fuel system control module 204 accesses the cam phaser data module 206 to compare the measured values to predetermined values. The predetermined values from the cam phaser data module 206 may include expected values under various normal operating modes. For example, the cam phaser pressure varies in proportion to a torque experienced by the cam 114 as the camshaft 112 rotates. The measured torque is compared to an expected torque for a particular operating mode to diagnose the operation of the fuel pump 118 and whether fuel is being properly delivered to the fuel rail 120.

The diagnosis may be confirmed by the fuel rail pressure that also varies in proportion to the torque experienced by the cam 114 as the camshaft 112 rotates. The fuel system control module 204 operates the fuel system 106, including taking remedial action, based on the diagnosis of the fuel pump 118.

Figure 3:
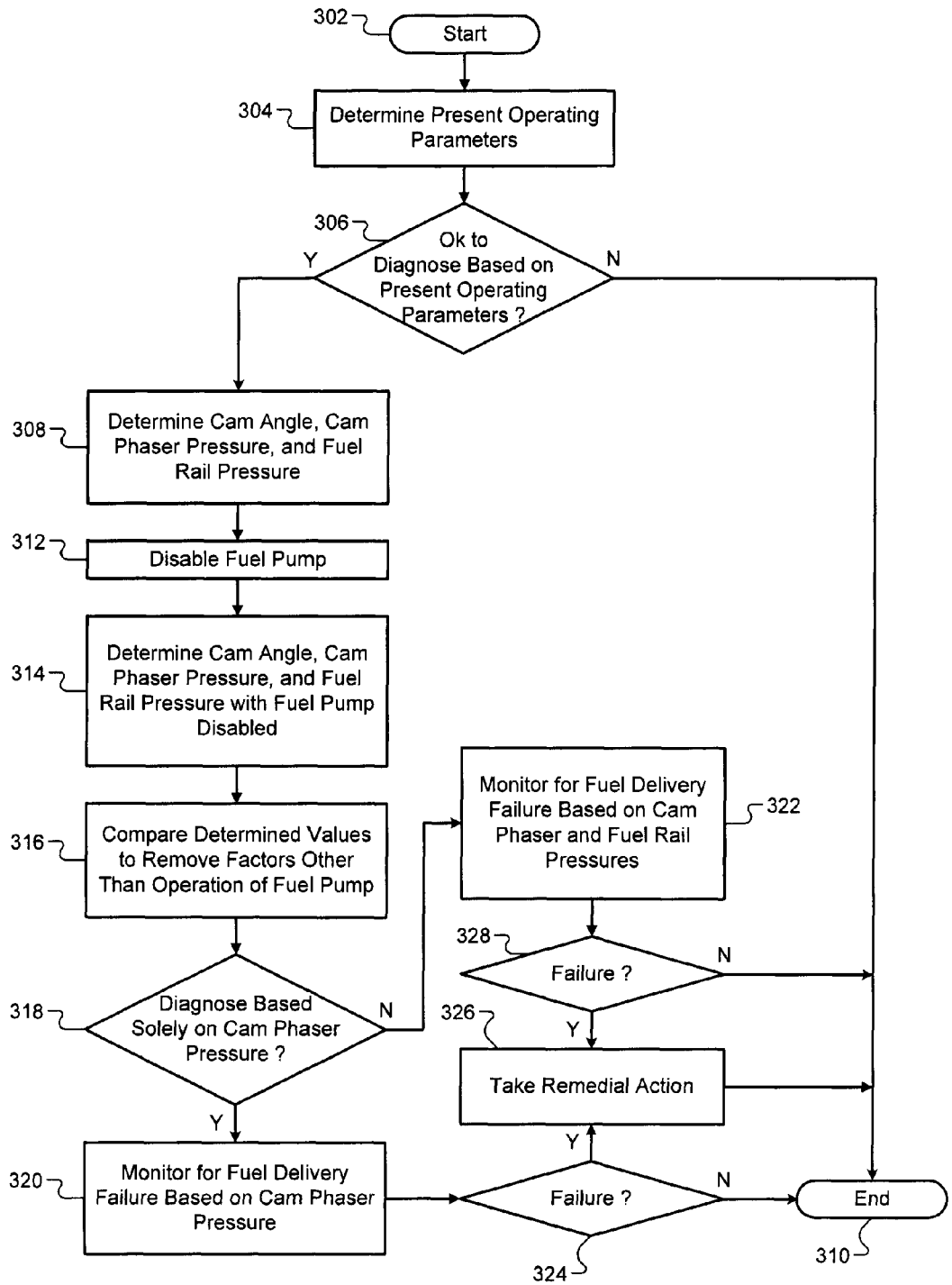
FIG. 3 is a flowchart depicting exemplary steps of an engine control method according to the principles of the present disclosure.

Referring now to FIG. 3, a flowchart depicting exemplary steps performed by an engine control method is shown. Control starts in step 302. In step 304, present operating parameters of the engine system 100 are determined. For example only, the present operating parameters may include an engine speed and/or and an engine load.

In step 306, control determines whether it is appropriate to diagnose the fuel pump 118 based on the present operating parameters. If true, control continues in step 308. If false, control ends in step 310. In step 308, the cam angle, the cam phaser pressure, and the fuel rail pressure are determined. The cam phaser and the fuel rail pressures are associated (i.e., synchronized) with the cam angle and may be stored in the measurement module 202 and/or the fuel system control module 204.

In step 312, the fuel pump 118 is disabled. In this manner, baseline measurements without the fuel pump 118 in operation are obtained for the cam phaser system 116 and the fuel rail 120. In step 314, the cam angle, the cam phaser pressure, and the fuel rail pressure are determined with the fuel pump 118 disabled.

In step 316, the determined values with the fuel pump 118 in operation are compared to the determined values with the fuel pump 118 disabled to remove aspects of the determined values with the fuel pump 118 in operation that were influenced by factors other than operation of the fuel pump 118. In step 318, control determines whether the fuel pump 118 will be diagnosed based solely on the cam phaser pressure or based also on the fuel rail pressure. If only the cam phaser pressure is to be considered, control continues in step 320. If both the cam phaser and the fuel rail pressures are to be considered, control continues in step 322.

Figure 4:
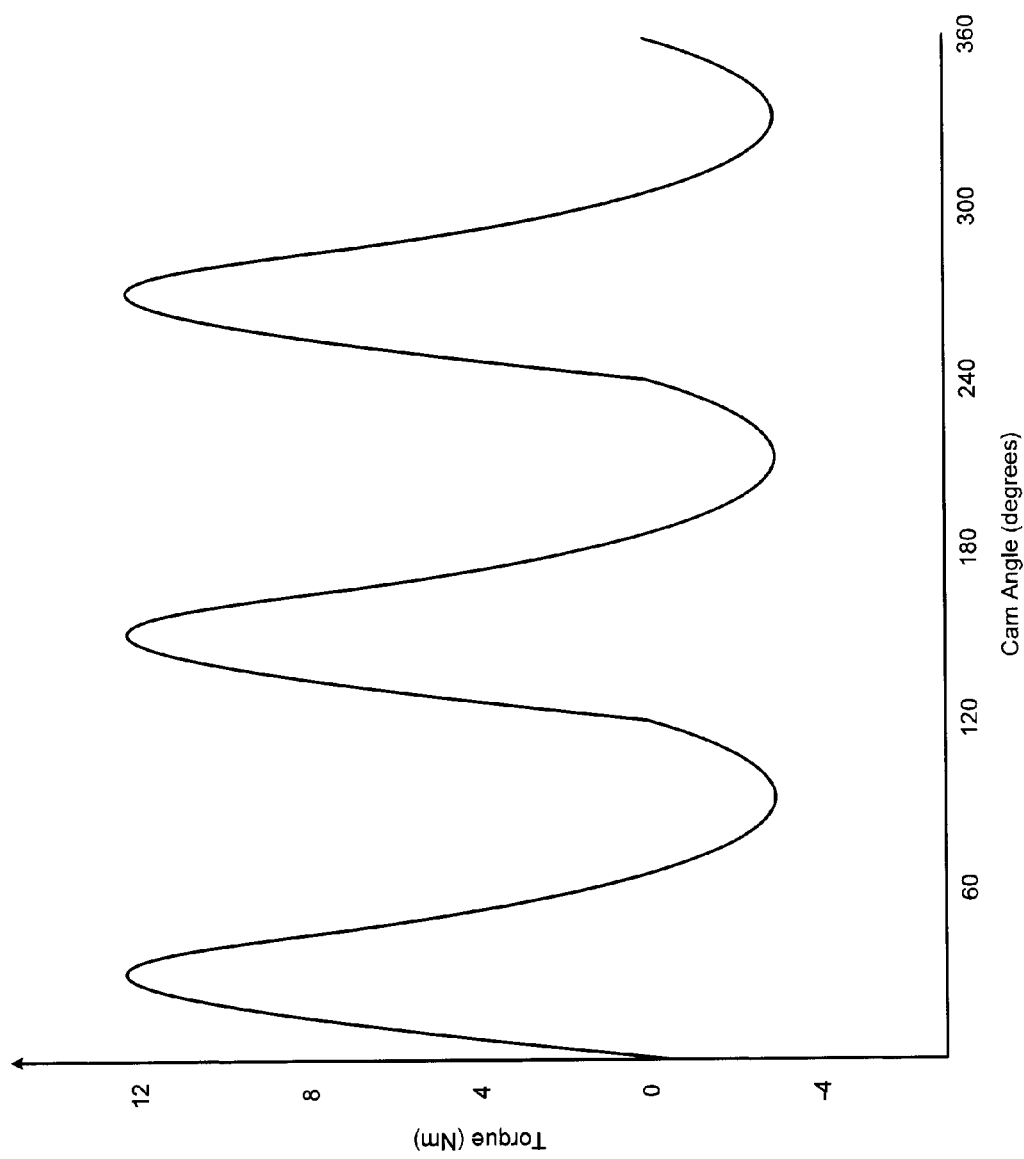
FIG. 4 is graph depicting a torque experienced by a cam versus a cam angle according to the principles of the present disclosure.

In step 320, the cam phaser data module 206 is accessed to acquire the predetermined values representing the expected torque experienced by the cam 114 when the fuel pump 118 is operating normally. An example of such an expected torque experienced by the cam 114 over a 360° camshaft rotation is depicted in FIG. 4. The measured torque experienced by the cam 114 is determined based on the cam phaser pressure and compared with the expected torque.

In step 324, control determines whether the measured torque differs from the expected torque by more than a predetermined threshold. If true, a failure is indicated, and control continues in step 326. If false, control ends in step 310.

Referring back to step 322, the fuel rail pressure is used in conjunction with the cam phaser pressure to determine whether there is a failure of the fuel pump 118. The cam phaser data module 206 is accessed to acquire the predetermined values representing the expected torque experienced by the cam 114 when the fuel pump 118 is operating normally. A first measured torque experienced by the cam 114 is determined based on the cam phaser pressure and compared with the expected torque. In addition, a second measured torque experienced by the cam 114 is determined based on the fuel rail pressure and compared with the expected torque.

In step 328, control determines whether the first measured torque or the second measured torque differs from the expected torque by more than the predetermined threshold. If true, the failure is indicated, and control continues in step 326. If false, control ends in step 310.

In step 326, the remedial action is taken. The remedial action may include modifying the operation of the fuel pump 118 or sending an error message to the engine control module 110. Control ends in step 310.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
a camshaft operably coupled to a crankshaft of an engine, wherein rotation of the camshaft operates a fuel pump in driving communication with a cam of the camshaft;
a cam phaser module that provides hydraulic pressure to change a rotational position of the cam about the camshaft;
a pressure sensor that determines a cam phaser pressure signal based on a pressure of fluid in the cam phaser module; and
an engine control module that diagnoses a condition of the fuel pump based on the cam phaser pressure signal.

2. The engine control system of claim 1 further comprising a fuel rail pressure sensor that determines a fuel rail pressure signal based on a pressure of fuel provided from the fuel pump to a fuel rail.

3. The engine control system of claim 2 wherein the engine control module diagnoses the condition of the fuel pump based on the cam phaser and the fuel rail pressure signals.

4. The engine control system of claim 2 wherein the engine control module normalizes the cam phaser and the fuel rail pressure signals.

5. The engine control system of claim 2 further comprising a position sensor that determines a cam angle signal based on the rotational position of the cam, wherein the cam phaser and the fuel rail pressure signals are each associated with the cam angle signal.

6. The engine control system of claim 2 wherein the engine control module determines a first torque experienced by the cam as the camshaft rotates based on the cam phaser pressure signal and determines a second torque experienced by the cam as the camshaft rotates based on the fuel rail pressure signal.

7. The engine control system of claim 6 wherein the engine control module diagnoses a fuel pump failure condition that indicates that a failure in fuel delivery has occurred when one of the first and the second torques deviate from a predetermined torque by more than a predetermined threshold.

8. The engine control system of claim 1 wherein the engine control module determines a torque experienced by the cam as the camshaft rotates based on the cam phaser pressure signal.

9. The engine control system of claim 8 wherein the engine control module diagnoses a fuel pump failure condition that indicates that a failure in fuel delivery has occurred when the determined torque deviates from a predetermined torque by more than a predetermined threshold.

10. The engine control system of claim 1 wherein the engine control module modifies the operation of the fuel pump when the engine control module diagnoses a fuel pump failure condition that indicates that a failure in fuel delivery has occurred.

11. A method of operating an engine control system, comprising:
operating a fuel pump in driving communication with a cam of a camshaft;
providing hydraulic pressure to change a rotational position of the cam about the camshaft;
determining a cam phaser pressure signal based on a pressure of fluid in a cam phaser module; and
diagnosing a condition of the fuel pump based on the cam phaser pressure signal.

12. The method of claim 11 further comprising determining a fuel rail pressure signal based on a pressure of fuel provided from the fuel pump to a fuel rail.

13. The method of claim 12 further comprising diagnosing the condition of the fuel pump based on the cam phaser and the fuel rail pressure signals.

14. The method of claim 12 further comprising normalizing the cam phaser and the fuel rail pressure signals.

15. The method of claim 12 further comprising determining a cam angle signal based on the rotational position of the cam, wherein the cam phaser and the fuel rail pressure signals are each associated with the cam angle signal.

16. The method of claim 12 further comprising:
determining a first torque experienced by the cam as the camshaft rotates based on the cam phaser pressure signal; and
determining a second torque experienced by the cam as the camshaft rotates based on the fuel rail pressure signal.

17. The method of claim 16 further comprising diagnosing a fuel pump failure condition that indicates that a failure in fuel delivery has occurred when one of the first and the second torques deviate from a predetermined torque by more than a predetermined threshold.

18. The method of claim 11 further comprising determining a torque experienced by the cam as the camshaft rotates based on the cam phaser pressure signal.

19. The method of claim 18 further comprising diagnosing a fuel pump failure condition that indicates that a failure in fuel delivery has occurred when the determined torque deviates from a predetermined torque by more than a predetermined threshold.

20. The method of claim 11 further comprising modifying the operation of the fuel pump when the engine control module diagnoses a fuel pump failure condition that indicates that a failure in fuel delivery has occurred.

* * * * *